(12) United States Patent
Hankinson et al.

(10) Patent No.: US 8,416,911 B2
(45) Date of Patent: Apr. 9, 2013

(54) NUCLEAR REACTOR CAVITY ARRANGEMENTS FOR ICE CONDENSER PLANTS

(75) Inventors: Michael F. Hankinson, Monroeville, PA (US); Larry C. Smith, Harrison City, PA (US); Joseph A. Harim, Dunbar, PA (US); John E. Bible, Ringgold, GA (US); Jianwei Chen, Wexford, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 222 days.

(21) Appl. No.: 13/041,464

(22) Filed: Mar. 7, 2011

(65) Prior Publication Data
US 2012/0148011 A1    Jun. 14, 2012

Related U.S. Application Data

(60) Provisional application No. 61/421,672, filed on Dec. 10, 2010.

(51) Int. Cl.
*G21C 9/00*    (2006.01)

(52) U.S. Cl.
USPC .................... 376/293; 376/287; 376/277

(58) Field of Classification Search ............ 376/293
See application file for complete search history.

(56) References Cited

U.S. PATENT DOCUMENTS

| | | | |
|---|---|---|---|
| 3,423,286 A * | 1/1969 | Hinds et al. | 376/284 |
| 3,726,759 A | 4/1973 | Taft et al. | |
| 3,984,282 A | 10/1976 | Kleimola | |
| 4,053,357 A | 10/1977 | Pradhan et al. | |
| 4,173,512 A | 11/1979 | Meier et al. | |
| 4,238,289 A | 12/1980 | Weems et al. | |
| 4,473,528 A | 9/1984 | Kleimola | |
| 8,126,107 B2 * | 2/2012 | Eckardt et al. | 376/293 |

* cited by examiner

*Primary Examiner* — Jack Keith
*Assistant Examiner* — Marshall O'Connor

(57) ABSTRACT

A pressurized water reactor nuclear containment radiation shield which surrounds the upper portion of a pressure vessel in an ice condenser containment. The vertical walls of the neutron shield are formed in vertical sections with the lower and upper sections operable during outages, to open to promote air flow cooling along the walls in the vicinity of the vessel head.

6 Claims, 6 Drawing Sheets

NUCLEAR REACTOR CAVITY ARRANGEMENTS FOR ICE CONDENSER PLANTS

CROSS REFERENCE TO RELATED APPLICATION

This application claims priority to Provisional Application Ser. No. 61/421,672, filed Dec. 10, 2010.

BACKGROUND

1. Field

This invention relates generally, to pressure-suppressing arrangements for nuclear reactor power systems and more particularly, to a missile barrier and radiation shield structure that surrounds the reactor vessel head as part of a containment structure for such plants.

2. Related Art

A reactor containment system of the condenser type, such as described in U.S. Pat. No. 3,423,286, issued Jan. 21, 1969, and assigned to the Assignee of this invention, is designed to rapidly absorb the energy release from the reactor coolant system in the improbable event of a loss of coolant accident. The energy is absorbed by condensing the steam in a low temperature heat sink consisting of a suitable quantity of fusible material in a solid state, such as ice, stored in a completely enclosed generally annular refrigerated compartment located radially between an inner wall which defines a reactor compartment and the outer wall of the nuclear plant containment, at an elevation generally above an operating deck which divides the reactor compartment into a lower compartment and an upper compartment.

In the event of a loss of coolant accident, door panels located at the bottom of the condenser compartment open almost immediately due to the pressure rise in the lower compartment caused by the release of reactor coolant. This allows the steam to flow from the lower compartment into the ice condenser. In turn, door panels at the top of the ice condenser compartment open and allow some of the air which was initially in the lower compartment and the ice condenser compartment to flow into the upper compartment. The ice condenser quickly begins to condense the steam, thus limiting the peak pressure in containment. Ice condenser plants require large missile barriers around the reactor head to funnel released loss of coolant accident energy to the ice condenser and to provide neutron shielding for the upper containment to permit ice condenser maintenance during power operation.

The current designs for the radiation shield and missile barriers are approximately two to four feet (0.61 to 1.22 meters) thick and do not provide the ventilation needed to cool the cavity walls surrounding the vessel head to enable safe personnel access to the reactor interior. It is has been found that the confined space within the barriers leaves the very thick concrete walls at elevated temperatures for many days or weeks as there is limited air circulation to create cooling. In addition, it would be desirable to reduce the "touch time," that is the time associated with handling the barriers to reduce the radiation exposure of maintenance personnel.

Accordingly, it is an object of the embodiment set forth hereafter to improve the air circulation within the radiation barriers surrounding the reactor vessel head to promote cooling of the concrete walls of the barriers during a reactor shutdown, so that the wall temperatures can be reduced to a safe level for access by maintenance personnel.

In addition, it is an object of the embodiment set forth hereafter to provide an improved barrier design that will lessen the weight of the barrier sections so that they can be more easily handled in a time effective manner to reduce radiation exposure to maintenance personnel.

SUMMARY OF THE INVENTION

In accordance with the embodiments herein disclosed, a nuclear steam supply system is provided having a containment enclosing a primary loop of the nuclear steam supply system. A reactor vessel is supported within a reactor well within a lower interior of the containment. A vertical shield wall substantially encircles an upper portion of the reactor vessel and extends vertically above the reactor well substantially to an elevation of an operating deck. A missile shield caps off a top of the vertical shield wall and the shield wall includes at least one air inlet door located along at least a portion of a lower section of the shield wall. The inlet door is normally closed during reactor operation, but is operable to open during an outage to enable cooling air flow along an interior of the shield wall.

Preferably, the inlet door is configured so that its opening can be operated remotely from the operating deck. Desirably, there are a plurality of the inlet doors spaced circumferentially around the lower section of the shield wall.

In one embodiment, an outlet door is located along at least a portion of an upper section of the shield wall, below the operating deck. The outlet door is configured to be normally closed during reactor operation, but is opened during an outage to enhance cooling air flow along the interior of the shield wall. Preferably, a plurality of outlet doors are spaced circumferentially around the upper section of the shield wall.

In another embodiment, the ventilation doors are provided with neutron absorbing panels. Desirably, a neutron absorbing panel is removably attached to the ventilation doors with fasteners. In one embodiment, the neutron absorbing panels are formed from a metal can filled with boro-silicate-type concrete. Preferably, the shield wall is constructed in sections, and desirably, each section has a weight that is no heavier than can be lifted by an auxiliary hook on the containment polar crane.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
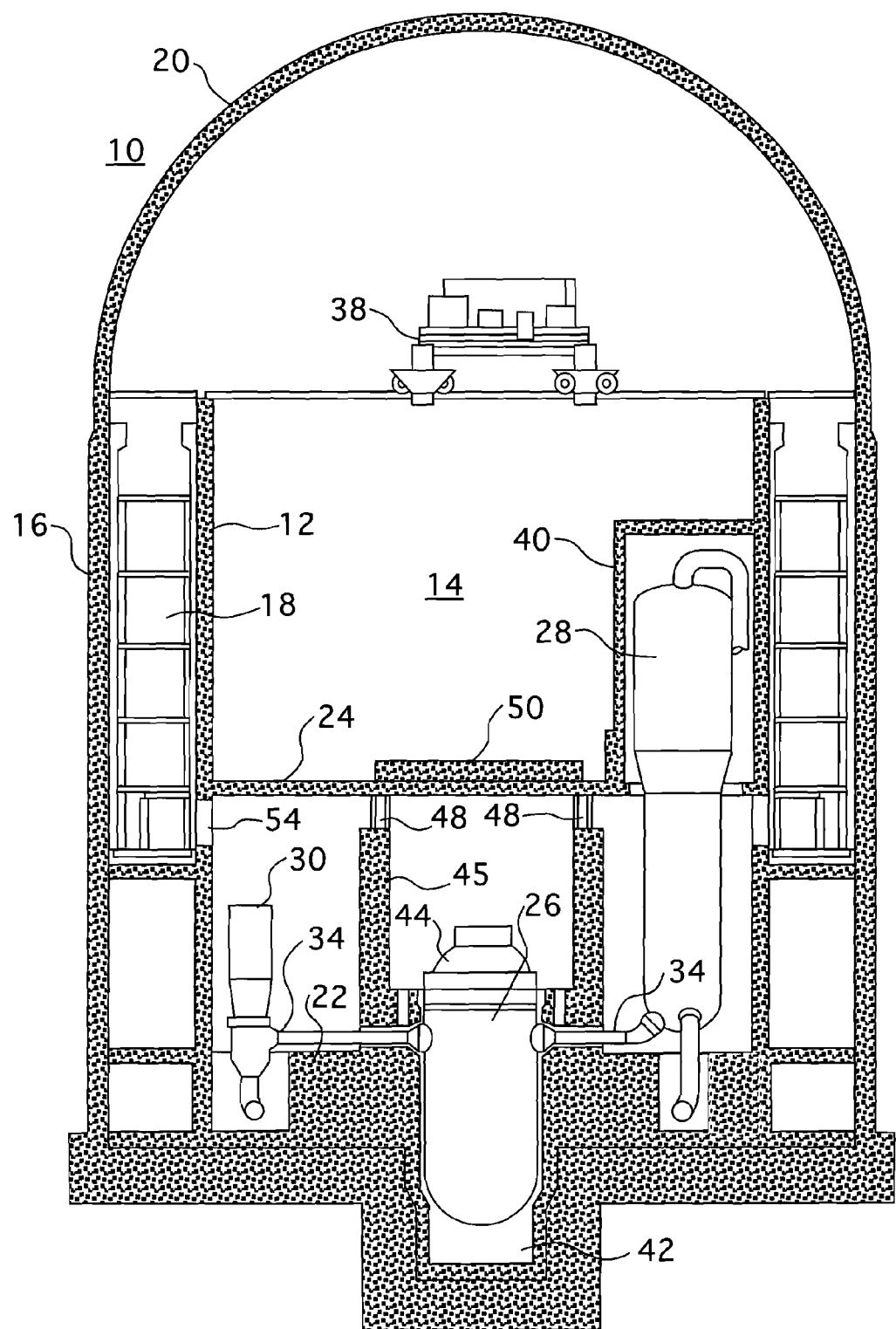
FIG. 1 is a vertical sectional view of a prior art nuclear reactor ice condenser containment system.

Referring to the drawings, particularly to FIG. 1, a reactor containment structure 10 is shown therein having an inner vertical generally cylindrical wall 12 defining a reactor compartment 14, an outer vertical generally cylindrical wall 16 spaced from the inner wall 12 to define a generally annular condenser compartment 18 between the walls 12 and 16, a generally hemispherical head 20 supported by the outer wall 16 and capping off a top of the containment building, and a horizontal floor 22. The containment structure is preferably formed from concrete or concrete with a metal liner.

As shown, the reactor compartment 14 is divided into upper and lower portions separated by an operating deck 24. The lower compartment completely encloses the fluid handling apparatus of the primary loop of the reactor, i.e., the reactor coolant system equipment, including a reactor vessel 26, steam generators 28, reactor coolant pumps 30, a pressurizer 32, shown in FIG. 2, and connecting piping 34. The upper compartment or portion contains a refueling canal 36, shown in FIG. 2, a crane 38 which is supported by the inner or crane wall 12 and additional refueling equipment (not shown). The steam generators 28 and the pressurizer 32 are enclosed by an extension 40 of the operating deck 24. The reactor vessel 26 is disposed in a well or sump 42 in the floor 22. The reactor vessel head 44 is enclosed by a primary shield wall 45 which is vented at 48. The vessel head enclosure is covered at the top by a removable concrete slab 50 which functions as a missile shield. The operation of the reactor power equipment is well known in the art and is more fully described in Application Ser. No. 12/495,873, filed Jul. 1, 2009, assigned to the Assignee of this application.

Figure 2:
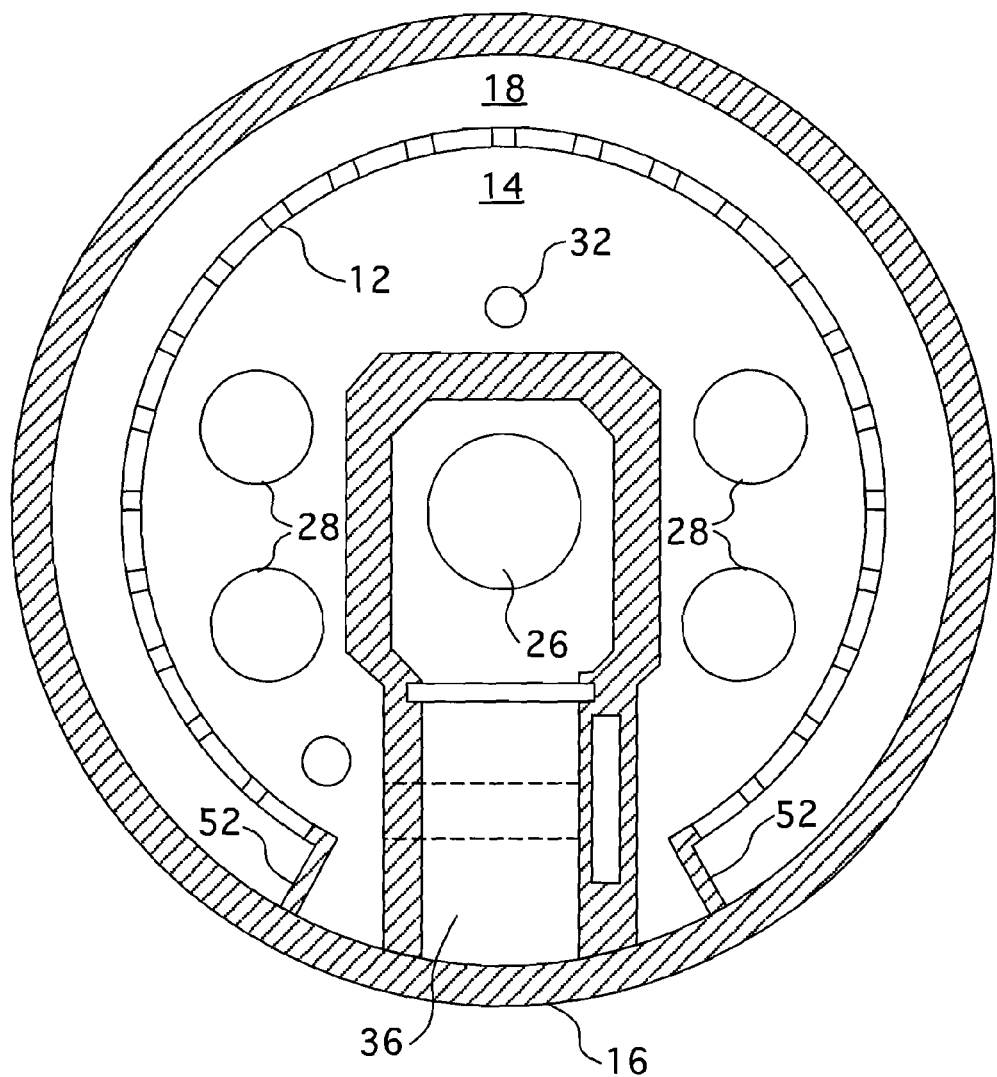
FIG. 2 is a plan view of the containment illustrated in FIG. 1, partly in section, showing the general location of the internal nuclear system components.

As shown in FIG. 2, the condenser compartment 18 is in the form of a completely enclosed, generally annular compartment which is located radially between the inner wall 12 and the outer wall 16, at an elevation generally above the operating deck 24, as can be seen best in FIG. 1. The condenser compartment 18 does not extend entirely around the containment structure, but does extend through an arc of approximately 300° as shown in FIG. 2. Thus, the condenser compartment substantially encircles the reactor compartment 14. The ends of the condenser compartment are enclosed by vertical end walls 52. The top of the condenser compartment 18 is enclosed by horizontally hinged doors and the bottom of the condenser compartment is enclosed by an insulated floor. Vertically hinged inlet doors are disposed in door ports 54 shown in FIG. 1, located in the inner wall 12 below the operating deck 24 and communicates between the reactor compartment 14 and the condenser compartment 18.

The condenser compartment 18 contains a quantity of fusible material, such as ice, in a solid state. The fusible material has the property of melting at a temperature lower than the condensation temperature of the condensable portions of the reactor coolant fluid which may escape from the reactor coolant system. The fusible material is supported in the condenser compartment 18 in the manner fully described in U.S. Pat. No. 3,726,759, issued Apr. 10, 1973, assigned to the Assignee of the current application.

As described in U.S. Pat. No. 3,432,286, in the event of a loss of coolant accident, the inlet doors at the ports 54 open almost immediately due to the pressure rise in the lower compartment caused by the release of reactor coolant. This would allow the steam to flow from the lower compartment into the ice condenser. In turn, the door panels at the top of the ice condenser would open and allow some of the air which was initially in the lower compartment and in the ice condenser compartment to flow into a plenum chamber between the walls 12 and 16 and hence into the upper reactor compartment through doors at the top of the ice condenser 18. The ice condenser would very quickly begin to condense the steam, thereby limiting the peak pressure in the containment structure 10.

Figure 3:
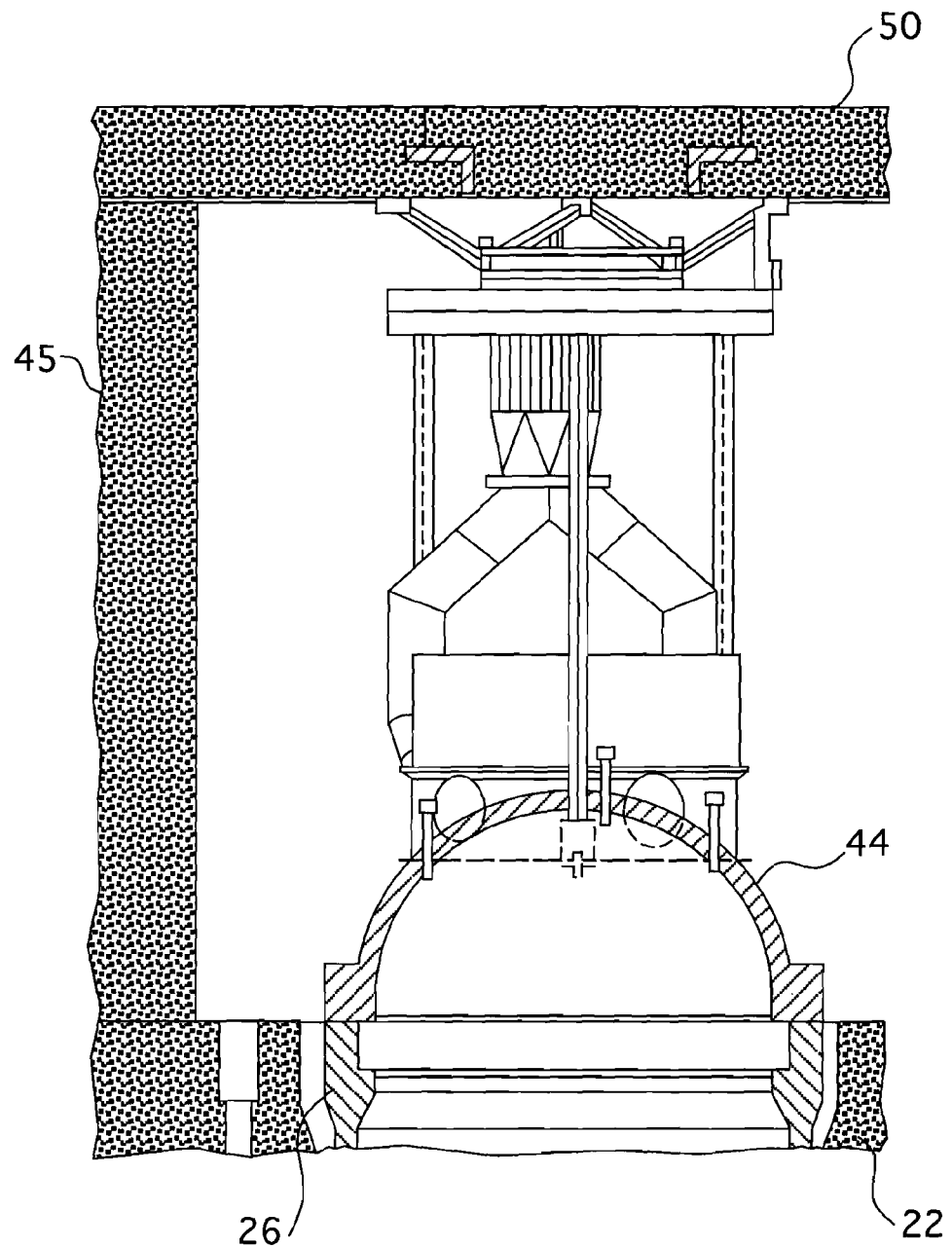
FIG. 3 is an elevational view of a portion of the prior art barrier arrangement around one side of a reactor vessel head integrated package.

As previously mentioned, ice condenser plants require large missile barriers 45 and 50 around the reactor head 44 to funnel released loss of coolant accident energy to the ice condenser and to provide neutron shielding for the upper containment 14 above the operating deck 24, to permit ice condenser maintenance during power operation. The current barriers are approximately two to four feet (0.61 to 1.22meters) thick and, as can be appreciated from FIGS. 1 and 3, provide little capability for the ventilation needed to cool the cavity walls above the reactor for safe personnel access to the reactor head. Access to the reactor head is necessary to remove the studs which fastened the reactor head 44 to the reactor vessel 26 to expose the core for refueling. Utility personnel have identified that the very thick concrete walls surrounding the reactor head 44 remain at elevated temperatures for many days or weeks following a shutdown of the reactor as there is effectively no air circulation to effect cooling Additionally, the "touch time" associated with handling the vertical barriers to gain access to the reactor head is cumbersome due to the weight of the sections of vertical barriers that need to be removed. Experience has shown that during plant operation, the walls 45 will tend to reach a steady state containment operating temperature approaching 120° F. (49° C.). When the reactor is shut down for refueling, the confined space behind the barriers does not allow effective cooling of these very thick walls so they remain warm for days or weeks. Once the top missile barrier 50 is removed, the intent is to begin stud removal from the reactor head as soon as possible. To effect this task, since the stud removal crew must initially work within near proximity of the barrier walls, having the walls retaining the temperature profile of reactor operation is unsafe and an unacceptable condition. FIG. 3 is an elevational view of the area in which this work has to be performed. Like reference characters are employed to designate the corresponding components among the several views.

Figure 4:
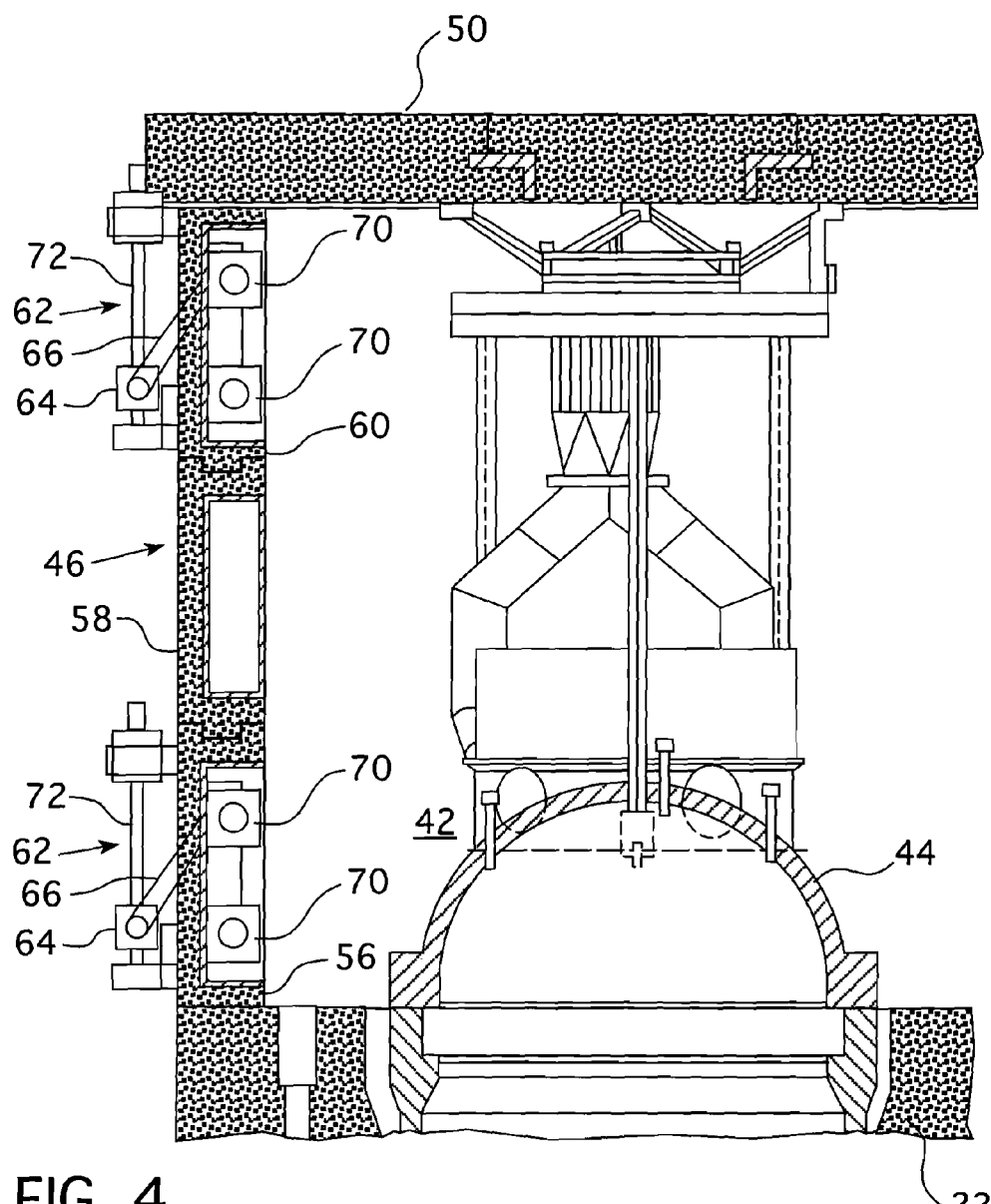
FIG. 4 is the elevational view shown in FIG. 3 with the side wall of the barrier replaced with an embodiment of this invention.

FIG. 4 is an elevational view similar to that of FIG. 3 showing a preferred embodiment of the wall 46 replacing that shown in FIG. 3 by reference character 45. The newly designed vertical walls in accordance with this embodiment utilize the inherent vertical height of the wall as a thermal stack and incorporates opening capability at the top and bottom sections. The openings allow hot air within the cavity 42 to escape at the top, and replacement cooler heads be drawn at the bottom of the wall 46, creating faster cooling of the inside volume. Since the thermal stack involves pulling the cooler air into the bottom of the cavity at the elevation of the reactor head 44 and exhausting warmer air at the top, it is doubtful that any benefit would be achieved by providing additional openings at the middle elevation of the wall. In fact, providing such an opening at the middle elevation may adversely affect the thermal gradient between openings at the bottom and top of the wall 46 and reduce the volume of air flow.

Figure 5:
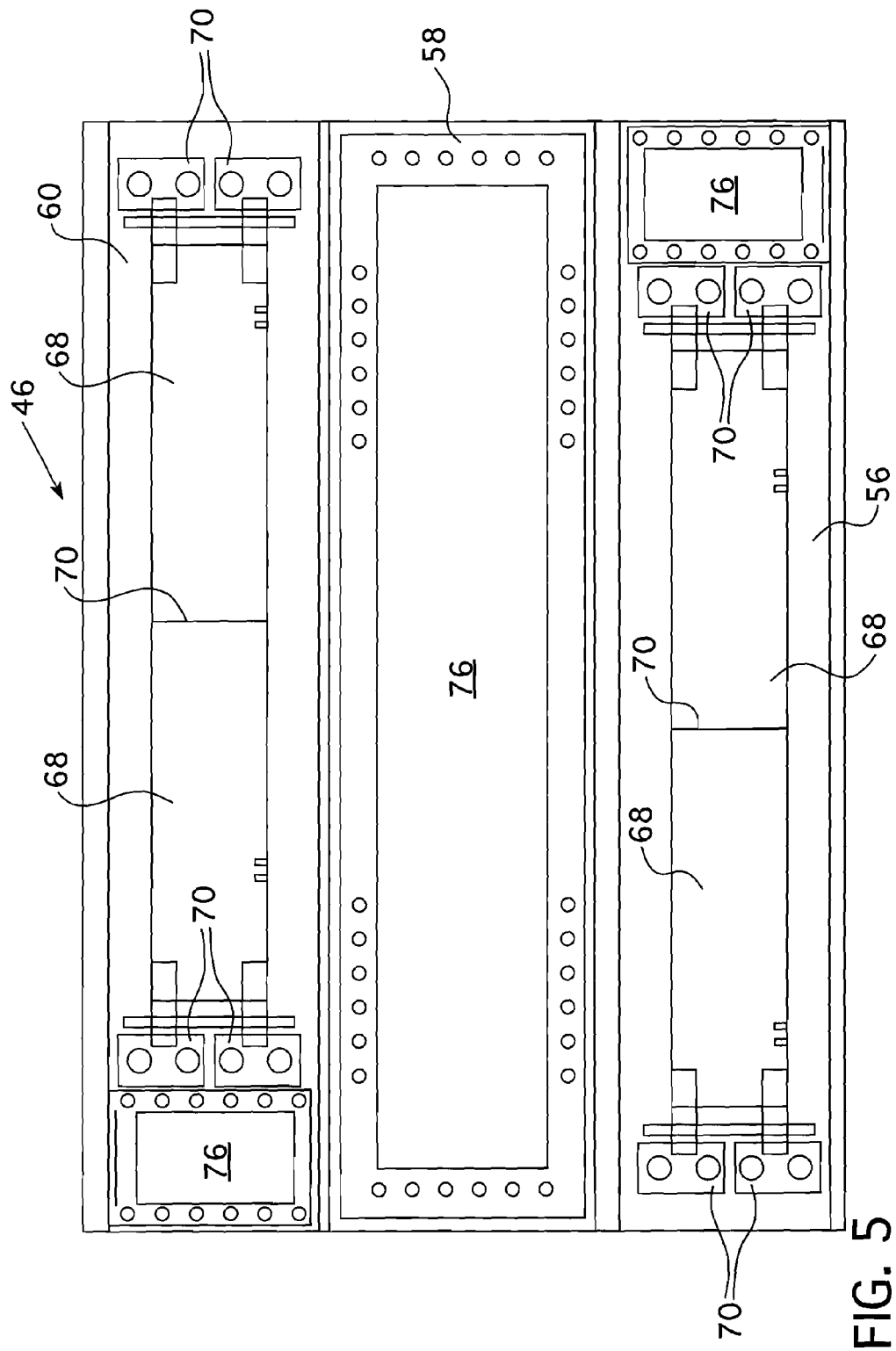
FIG. 5 is an inside view of the vertical shield wall assembly shown in FIG. 3 with openings in top and bottom sections and bolt-on neutron absorber panels.
Figure 6:
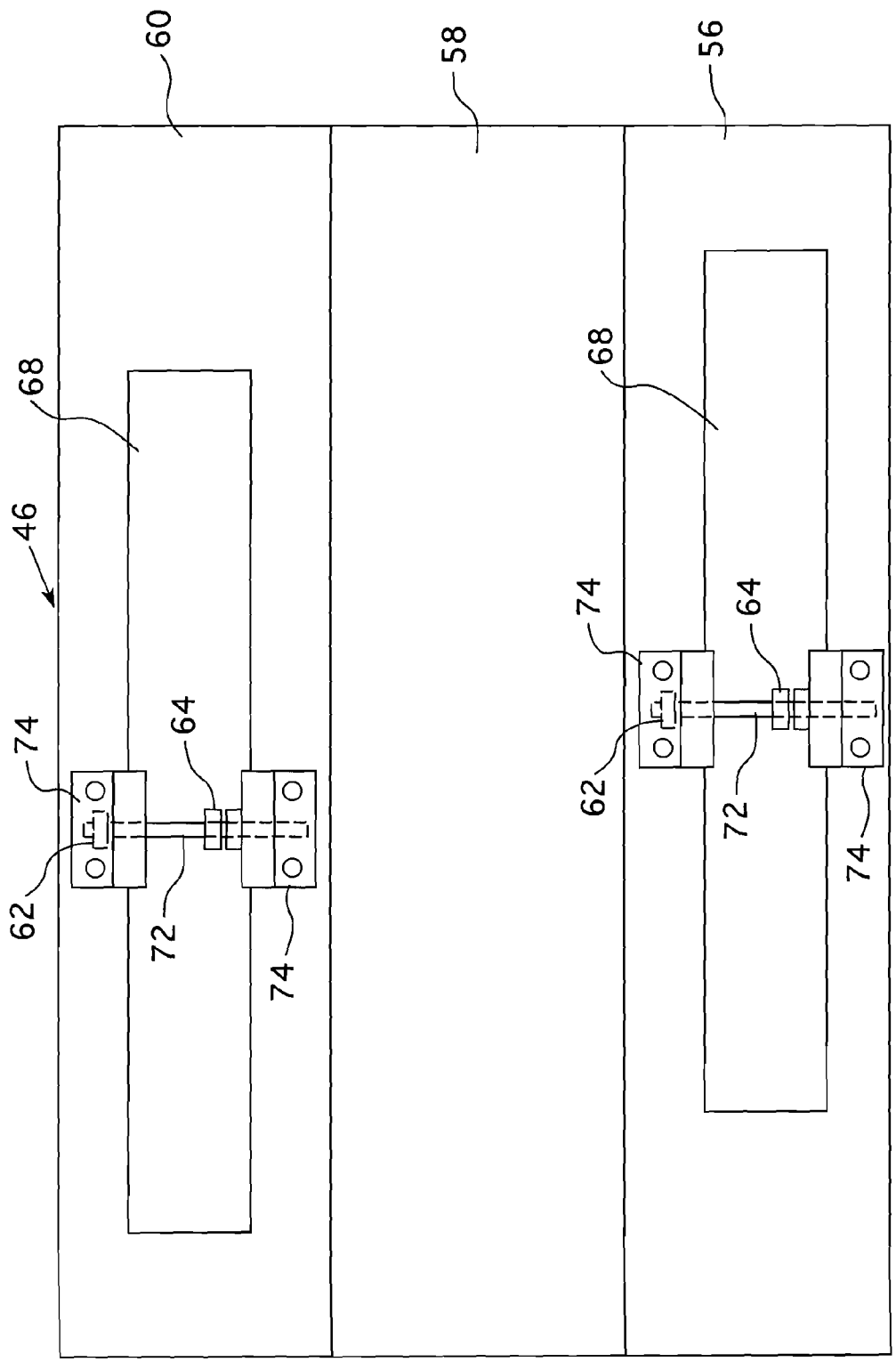
FIG. 6 is an outside view of the vertical shield wall assembly shown in FIG. 5.

As can be seen in FIGS. 4, 5 and 6, the vertical wall barrier 46 is formed from three vertical panels 56, 58 and 60. The door mechanism of the lower panel 56 allows an operator standing on the operating deck 24 to open the lower door with a simple T-wrench. The door in the upper panel 60 can be opened locally with a permanently installed T-handle or crank. In particular, the panels 56 and 60 include a vent crank 62 that, for example, may employ a twoinch (5.1 centimeters) acme thread 72 and Nitronic stainless collar 64 that rides on the thread and has attached two actuation arms 66 that are attached to the free end of the vent doors 68 in the panels 56 and 60. When the acme threads 62 are cranked, the collars 64 ride up and exert an inward pressure on the doors 68 which causes the vent doors to open inwardly in the direction of the reactor vessel. In this embodiment, the doors are hinged on the outside employing two-inch (5.1 centimeters) shoulder bolts at the hinges 70.

An inside view of the three-tier wall panels 46, previously described with respect to FIG. 4, is shown in FIG. 5 with FIG. 6 showing an outside view of the same wall section. As can be seen from FIG. 5, the doors 68 are split at their center opening 70 and hinged on the outside, for example, with one-inch diameter (2.54 centimeters) vertical hinges. FIG. 6 shows an outside view of the panels 56, 58 and 60 with the cranks 62 shown offset by approximately nine inches (22.9 centimeters) to enable access from the operating deck 24 to affix a wrench on the acme screws 72 to turn the cranks. The cranks are affixed to the stationary portions of the wall panels 56 and 60 with support brackets 74 which retains the acme screws 72 on which the collars 64 ride to move the actuation arm 66 between closed and opened positions as previously described.

To maintain or improve upon the neutron attenuation properties of the current thick, heavier barriers, bolt-on neutron panels 76, shown in FIG. 5, can be added to the steel frames of the wall sections 56, 58 and 60. The neutron panels 76 will preferably be stainless steel cans filled with boro-silicate-type concrete typically used elsewhere in reactor plants for neutron attenuation, though it should be appreciated that other materials that shield neutrons may be employed. Boro-silicate-type concrete is a better shield than the existing concrete in terms of neutron attenuation per unit weight, permitting an overall lightening of the mass of the panels 56, 58 and 60, which must be handled at each outage. Also, the bolt-on nature allows replacement or adjustment of the neutron absorbing capabilities, if ever desired. Additional neutron shielding can be added at the reactor flange level, where the reactor head 44 meets the vessel 26, possibly eliminating the need for any shielding on the remaining cavity barriers, which can result in an even further weight reduction. A similar construction, i.e., the use of boro-silicate-type concrete can be employed for the horizontal missile shield 50 that sits on top of the wall 46. The general objective is to lighten all barrier sections such that they can be lifted by the polar crane auxiliary hook, which is much faster and easier to use than the main polar crane hook.

Accordingly, while specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear steam supply system comprising:
   a containment enclosing a primary loop of the nuclear steam supply system within an interior thereof;
   a reactor vessel supported within a reactor well within a lower interior of the containment, the reactor well having walls that substantially surround a lower portion of the reactor vessel;
   a vertical shield wall that extends up from an upper portion of the reactor well walls and substantially encircles an upper portion of the reactor vessel and extends vertically above the reactor well substantially to an elevation of an operating deck;
   a missile shield capping a top of the vertical shield wall; and
   wherein the shield wall includes at least one air inlet door located along at least a portion of a lower section of the shield wall, the inlet door being configured to be normally closed during reactor operation, but is configured to be opened during an outage to enable cooling air flow along an interior of the shield wall, and an outlet door located along at least a portion of an upper section of the shield wail, below the operating deck, the outlet door being configured to be normally closed during, reactor operation, but is configured to be opened during an outage to enable cooling air flow along the interior of the shield wall.

2. The nuclear steam supply system of claim 1 including a plurality of the outlet doors spaced circumferentially around. the upper section of the shield wall.

3. A nuclear steam supply system comprising:
   a containment enclosing a primary loop of the nuclear steam supply system within an interior thereof;
   a reactor vessel supported within a reactor well within a lower interior of the containment the reactor well having walls that substantially surround a lower portion of the reactor vessel;
   a vertical shield wall that extends up from an upper portion of the reactor well walls and substantially encircles an upper portion of the reactor vessel and extends vertically above the reactor well substantially to an elevation of an operating deck;
   a missile shield capping a top of the vertical shield wall; and
   wherein the shield wall includes at least one air inlet door located along at least a portion of a lower section of the shield wall, the inlet door being configured to be normally closed during reactor operation, but is configured to be opened during an outage to enable cooling air flow along an interior of the shield wall and wherein the inlet door has a neutron absorbent panel.

4. The nuclear steam supply system of claim 3 wherein the neutron absorbent panel is removeably attached to the inlet door with fasteners.

5. The nuclear steam supply system of claim 3 wherein the neutron absorbent panel is formed from a metal can filled with boro-silicate concrete.

6. A nuclear steam supply system comprising:
   a containment enclosing primary loop of the nuclear steam supply system within an interior thereof:
   a reactor vessel supported within a reactor well within a lower interior of the containment, the reactor well having walls that substantially surround a lower portion of the reactor vessel:
   a vertical shield wall that extends up from an upper portion of the reactor well walls and substantially encircles an upper portion of the reactor vessel and extends vertically above the reactor well substantially to an elevation of an operating deck;
   a missile shield capping a top of the vertical shield walk; and
   wherein the shield wall includes at least one air inlet door located along at least a portion of a lower section of the shield wall, the inlet door being configured to be normally closed during reactor operation, but is configured to he opened during an outage to enable cooling air flow along an interior of the shield wall and wherein the containment has a polar crane with an main and auxiliary hook and the shield wall is constructed in sections with substantially each section having a weight that is no heavier than can be lifted by the auxiliary hook.

* * * * *